United States Patent
Schömig et al.

(10) Patent No.: US 8,844,699 B2
(45) Date of Patent: Sep. 30, 2014

(54) CLUTCH ASSEMBLY WITH WEAR COMPENSATION

(75) Inventors: Peter Schömig, Rimpar (DE); Marco Greubel, Oerlenbach (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 554 days.

(21) Appl. No.: 13/100,113

(22) Filed: May 3, 2011

(65) Prior Publication Data
US 2011/0272235 A1 Nov. 10, 2011

(30) Foreign Application Priority Data
May 4, 2010 (DE) .......................... 10 2010 028 538

(51) Int. Cl.
*F16D 13/71* (2006.01)
*F16D 13/75* (2006.01)

(52) U.S. Cl.
USPC ............... 192/70.252; 192/89.22; 192/111.16

(58) Field of Classification Search
USPC .................. 192/66.31, 89.2, 89.22–89.24
See application file for complete search history.

(56) References Cited

U.S. PATENT DOCUMENTS

| 4,326,611 A | | 4/1982 | Billet | |
| 4,353,451 A | * | 10/1982 | Bacher | 192/89.23 |
| 5,088,583 A | * | 2/1992 | Takeuchi et al. | 192/89.23 |
| 5,301,782 A | * | 4/1994 | de Briel et al. | 192/89.23 |
| 5,758,756 A | * | 6/1998 | Weiss et al. | 192/70.252 |
| 5,813,507 A | * | 9/1998 | Brazier et al. | 192/89.23 |
| 5,855,267 A | * | 1/1999 | Giroire et al. | 192/89.23 |
| 6,354,418 B1 | * | 3/2002 | Dalbiez | 192/89.24 |
| 6,877,596 B2 | * | 4/2005 | Pahrisch et al. | 192/89.23 |

FOREIGN PATENT DOCUMENTS

| DE | 1 929 823 | 12/1970 |
| DE | 30 17 855 | 11/1980 |
| DE | 10 2007 053 161 | 6/2008 |
| DE | 10 2007 053 724 | 6/2008 |
| FR | 2 688 557 | 9/1993 |
| GB | 1 511 745 | 5/1978 |

\* cited by examiner

*Primary Examiner* — Jacob S Scott
(74) *Attorney, Agent, or Firm* — Cozen O'Connor

(57) ABSTRACT

A clutch assembly, particularly for a friction clutch of a motor vehicle, with at least one clutch housing in which is arranged a diaphragm spring that acts on a pressure plate and is secured to the clutch housing by a holding ring with retaining tabs distributed over a circumference at a distance axially from the holding ring. The retaining tabs define an axial stop. A spring element is arranged between two adjacent structural component parts of the clutch assembly that are arranged between the holding ring and the axial stop of the retaining tabs that exerts an axial spring force on the adjacent structural component parts. The spring element is arranged on at least one retaining tab and has at least two edge-side support regions that extend in direction of the adjacent retaining tabs and at least partially contact one structural component part and at least one axial raised portion arranged between the support regions that at least partially contacts the other structural component part.

14 Claims, 3 Drawing Sheets

I - I

I-I

II-II

CLUTCH ASSEMBLY WITH WEAR COMPENSATION

BACKGROUND OF THE INVENTION

1. Field of the Invention

The present invention is directed to a clutch assembly, particularly for a friction clutch of a motor vehicle, with at least one clutch housing in which a diaphragm spring is arranged that acts on a pressure plate, or clutch cover, and secured to the clutch housing by a holding ring with retaining tabs distributed over the circumference at a distance axially from the holding ring. The retaining tabs are arranged so as to define an axial stop. A spring element is arranged between two adjacent structural component parts of the clutch assembly arranged between the holding ring and the axial stop of the retaining tabs, this spring element exerting an axial spring force on the adjacent structural component parts.

2. Description of the Related Art

In devices of the type mentioned above, the diaphragm spring supports become worn over the lifespan of the clutch when the pressure plates are actuated by pressure, particularly pressure plates in vehicle friction clutches. The release travel of the pressure plate is reduced through this wear. If the expected amount of wear is allowed for in the design of the clutch, the release travel in the new clutch is greater by the amount of wear than is actually necessary. This results in an unfavorable gear ratio and poor efficiency with correspondingly high releasing force.

On the other hand, if the wear is not taken into account, the space resulting between the diaphragm spring and the surrounding structural component parts owing to wear reduces the release travel of the pressure plate. One result of the reduced release travel may be a malfunctioning of the pressure plate, i.e., the clutch can no longer be separated. However, at the same time, this means that it is no longer possible to change gears so that the motor vehicle must be towed in some cases.

Therefore, it has been proposed in the prior art to compensate for the wear of the supports by preloaded resilient elements in the form of an annular spring with axial raised portions or a disk spring. In pressure plates with a holding ring, this disk spring is inserted above the housing under the tabs of the holding ring so that the spring is preloaded when assembled. When wear occurs, the disk spring relaxes by a corresponding amount and accordingly compensates for the wear.

DE 102007053724 and DE 102007053161 suggest a clutch device in which an annular spring element is inserted between the holding element and the clutch housing or between the holding element and the diaphragm spring. The spring element has portions that are offset axially relative to one another and which exert an axial force on the surrounding structural component parts.

Further, it is known from GB 1 511 745 to construct the holding element in such that it possesses a characteristic resembling that of a disk spring so that wear can be compensated in an analogous manner.

However, these solutions are disadvantageous in that the springs are very costly to produce, particularly when care must be taken to place them in the exact wanted circumferential position. Assembly costs are also relatively high because the fabricated springs must be handled with precision during assembly in order to achieve the correct final assembly position. Further, the spring deflection provided by the annular springs is usually too small.

SUMMARY OF THE INVENTION

An object of the present invention is to provide a wear-compensating clutch assembly for a friction clutch that is inexpensive to produce, easy to assemble and has a sufficiently large spring deflection.

One embodiment of the invention is based on the idea of using individual resilient elements instead of a spring ring which is inserted circumferentially, the quantity of these individual resilient elements ultimately determining the total spring force. The spring elements are each arranged on at least one of the retaining tabs of a holding ring which secures the diaphragm spring to a clutch housing. For this purpose, the spring elements are inserted between two adjacent structural component parts of the clutch assembly in such a way that they are arranged between the holding ring and the axial stop of the retaining tabs. The axial stop of the retaining tabs can be carried out, for example, in a known manner by bending the ends of the tabs in direction of the clutch housing.

Further, each individual spring element has at least two edge-side support regions which at least partially contact one structural component part and, further, has at least one axial raised portion which is arranged between the support regions and which at least partially contacts the other structural component part.

The spring element can be arranged between the axial stop of the retaining tabs and the clutch housing, the axial raised portion being supported at the axial stop of the retaining tab, while the two edge-side support regions contact the clutch housing. During assembly, the axial raised portion is compressed so that there is a spring preloading in axial direction between the clutch housing and the axial stop of the retaining tabs. When wear occurs, this spring preloading causes the clutch housing and axial stop of the holding element to be pressed apart so that no air gap can occur between the diaphragm spring and the clutch housing or another structural component part.

In this regard, it does not matter whether the spring element is arranged between the axial stop of the retaining tabs and the clutch housing or between the holding ring and the diaphragm spring or between the clutch housing and the diaphragm spring. However, it can also always be provided between two other structural component parts arranged between the axial stop of the retaining tabs and the holding ring because it should merely be ensured that no air gap occurs between the diaphragm spring and one of the structural component parts surrounding it.

The exact construction of the spring element can vary depending on the installation position so that it may be adapted to the structural conditions. However, it is the case with all of the spring elements that the axial raised portion of the spring element is supported at one structural component part and the support regions are supported at the other structural component part.

According to a preferred embodiment form of the invention, the axial raised portion has at least one cutout for at least one retaining tab. Accordingly, the spring element can be positioned in a simple and self-explanatory manner so that assembly errors can be avoided.

Further, the cutout can be formed as an opening, particularly as an elongated hole, which is penetrated by the retaining tab. This has the advantage that the centrifugal forces occurring during the operation of the clutch do not cause the spring element to slip out of position.

Further, it is advantageous for a good fit of the spring element in the clutch when the spring element is shaped as an annular segment, its radius being adapted in an advantageous manner to the radius of the adjacent structural component part of the clutch.

According to another preferred embodiment example, the spring element according to the invention has a guide on at least one of the edge-side support regions, this guide being designed to enclose a retaining tab adjacent to the retaining tab arranged at the axial raised portion. In this regard, it is especially preferable that both of the edge-side support regions have a guide of this kind. The installation position of the spring element is defined by this guide and the spring element is prevented from slipping out of position due to centrifugal forces occurring during operation of the clutch.

Due to the fact that the spring preloading provided by pressing down on the axial raised portion also causes a tangential movement, i.e., a lengthening, of the spring element, the support region is preferably designed so as to enable a relative movement of the support region along the associated structural component part. At the same time, this movability ensures that the return movement, i.e., shortening, of the support regions occurring when the spring element relaxes is not impaired.

The guides are preferably designed in such a way that the spring element can move along the retaining tabs.

To provide for movability of this kind, the guide can be constructed as a guide that is open at the edge side so that the guide has the shape of a groove. This has the particular advantage that excessive care need not be taken with respect to circumferential orientation when installing the wear compensation device because the groove-shaped cutout has a margin of error for installation.

Instead of being groove-shaped, the guide can also be constructed as an opening shaped in particular as an elongated hole. The dimensioning is preferably adapted to the anticipated movement.

According to another advantageous embodiment example, the spring element can have two or more axial raised portions, each of which can be outfitted with cutouts, and another segment region is arranged between the axial raised portions. The spring element advantageously comprises three to five retaining tabs. In this respect, preferably two retaining tabs are encompassed by the guides, while the retaining tab(s) arranged in the center is/are arranged at the axial raised portion(s).

As was already mentioned above, the cutout in the axial raised portion can be formed as an opening which is penetrated by a retaining tab. However, it is also possible to construct the cutout as a radial notch so that the retaining tab extends into the notch. This embodiment form is particularly advantageous when the spring element is arranged between the diaphragm spring and the holding ring or between the diaphragm spring and the clutch housing rather than between the clutch housing and the axial stop of the retaining tab. The radial notch preferably extends along the entire axial raised portion.

According to another preferred embodiment example, at least two separate spring elements are provided, each of which has at least two edge-side support regions and an axial raised portion arranged between the support regions. The spring elements are arranged in such a way that an axial tilting of the structural component parts in the clutch housing is preventable. The spring elements are arranged so as to be distributed along the circumference substantially equidistant from one another. For example, if two spring elements are provided, they are arranged opposite one another. If three spring elements are provided, they are also substantially equidistant from one another.

The spring force of the spring elements can advantageously be determined by the height of the axial raised portion and the stiffness of the spring element material that is used. But the spring force can also be adjusted by the quantity of spring elements that are provided. The spring force is increased when more spring elements are provided. This has the advantage in particular that the spring characteristic of the spring element can be adapted in a simple and economical manner depending on the requirements of the clutch to be produced.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

Without limiting generality, the invention will be described more fully in the following by way of example with reference to embodiment examples shown in the drawings. In the drawings.

In the following, identical elements or identically functioning elements are designated by identical reference numerals.

DETAILED DESCRIPTION OF THE PRESENTLY PREFERRED EMBODIMENTS

Figure 1:
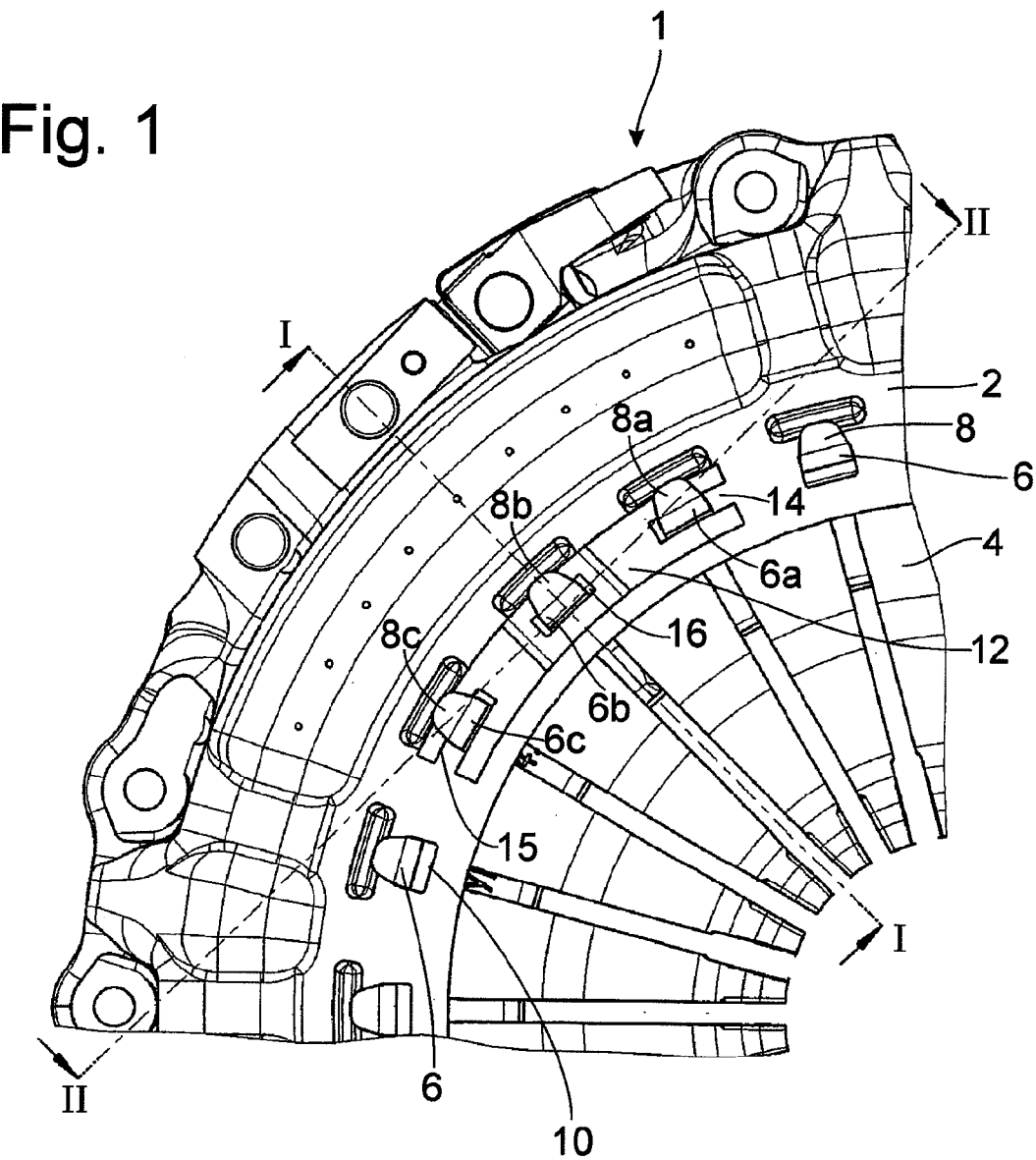
FIG. 1 is a top view of a section of a friction clutch according to a first embodiment example of the present invention.

FIG. 1 shows a schematic top view of a portion of a friction clutch 1 with a clutch housing 2 comprising a diaphragm spring 4. The diaphragm spring 4 and the clutch housing 2 are fastened to one another by a holding ring. However, the holding ring is represented in FIG. 1 only by the axially spaced retaining tabs 6 distributed over the circumference. The retaining tabs 6 are bent radially outward so that they form an axial stop 8a-8c. Instead of the ends of the tabs being bent axially outward, the retaining tabs 6 can also be bent radially inward or circumferentially in clockwise or counterclockwise direction to define the axial stop 8a-8c.

For assembly, the retaining tabs 6 are guided through openings (not shown) in the diaphragm spring 4 and openings 10 in the clutch housing 2 and then fixed so that the diaphragm spring is secured to the clutch housing.

Figure 2:
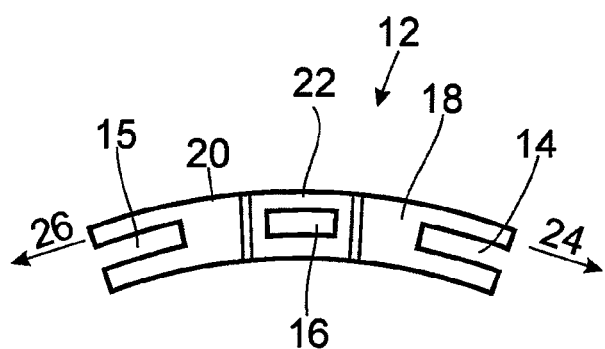
FIG. 2 is a top view of the spring element according to the invention.

As can be seen from FIG. 1 and the detailed view of the spring element 12 shown in FIG. 2, a spring element 12 is arranged between the clutch housing 2 and the axial stops 8a to 8c of three adjacent retaining tabs 6a to 6c. According to one embodiment of the invention, the spring element 12 is designed to compensate for wear. In the embodiment example shown herein, the spring element 12 encompasses three holding elements 6a, 6b, 6c; holding elements 6a and 6c are enclosed by edge-side guides 14, 15, while holding element 6b penetrates the centrally arranged cutout 16. The edge-side guides are arranged in support regions 18, 20, while the opening 16 is formed in an axial raised portion 22. (FIG. 2).

During assembly, this raised portion 22 is pressed in direction of the clutch housing 2 when the retaining tabs 6 are bent resulting in spring preloading.

Instead of encompassing three retaining tabs 6a to 6c as in the present instance, the spring element 12 can also encompass four or more retaining tabs 6. However, it is also possible that the spring element 12 is merely arranged at one of the retaining tabs 6 and does not extend as far as the adjacent retaining tabs. If spring elements of this kind are to be arranged at every retaining tab, the support regions 18, are preferably dimensioned in such a way that they do not block the spring elements when moving.

Further, the spring element 12 has an opening 16 which is arranged approximately in the center and which is penetrated by a retaining tab 6b. For this purpose, the retaining tab 6b is arranged at the axial raised portion 22 of the spring element 12. In the present embodiment example, the axial raised portion 22 contacts the axial stop 8b of the retaining tab 6b, while the support regions 18, 20 are supported at the clutch housing 2. Naturally, it is also possible that the axial raised portion 22 contacts the clutch housing 2, while the support regions 18, 20 are supported at the axial stops 8a and 8c.

As is shown, the edge-side guides 14, 15 can be constructed so as to be open at the edges so that they are groove-shaped. This constructional shape has the advantage that it is possible for the retaining tabs 6a, 6c to move in the guides 14, 15 during the assembly of the spring element 12 even when the spring element 12 is not positioned exactly in circumferential direction.

As is further shown in FIG. 2, the spring element 12 according to one embodiment of the invention has an axial raised portion 22 which, in the present embodiment example, has the opening 16 for receiving the retaining tab 6b. The opening 16 is preferably shaped as an elongated hole which is dimensioned corresponding to the dimensions of the retaining tab 6b.

The height of the axial raised portion 22, the stiffness of the material of the spring element 12, and the quantity of spring elements 12 which are distributed over the circumference of the clutch determine the total spring force applied by the spring element.

The spring preloading is carried out by the compression or reduction of the axial raised portion 22 when bending the retaining tabs 6. In so doing, the spring element 12 is pressed apart in direction of the arrows 24, 26 so that a relative movement oriented tangential to the axial raised portion 22 takes place between the support regions 18, 20 and the retaining tabs 6a, 6c received in the guides 14, 15. When wear occurs, play results between the holding ring 5, (FIG. 4) diaphragm spring 4 and housing 2 so that the spring element 12 begins to relax and contracts again so that a relative movement of the holding elements 6a, 6c in the guides 14, 15 occurs in turn. For this reason, the guides 14, 15 are preferably dimensioned so as to ensure that the retaining tabs 6a, 6c can move.

Figure 3:
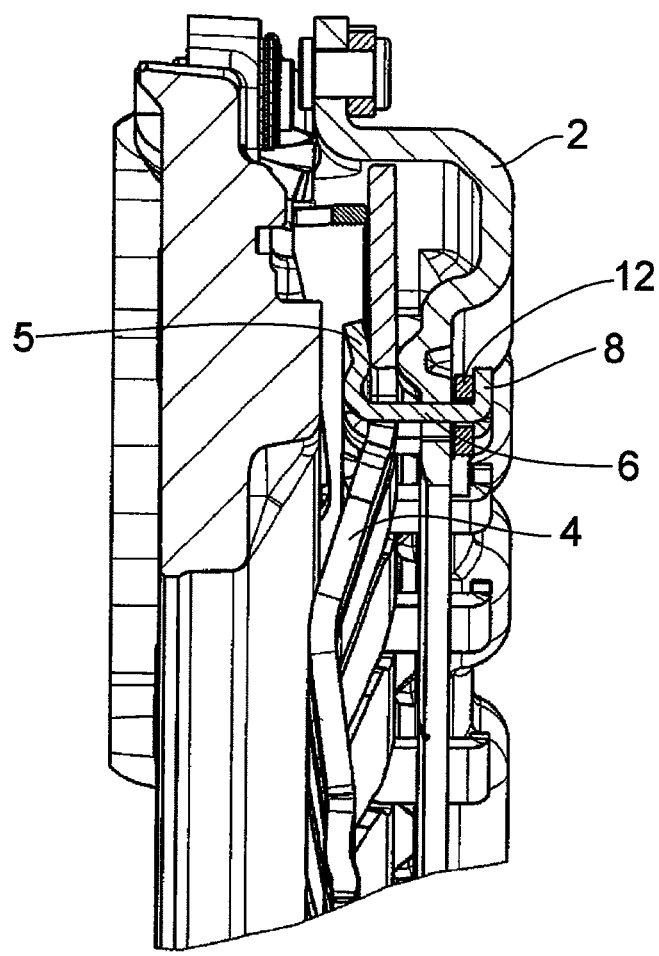
FIG. 3 is a sectional view through the friction clutch shown in FIG. 1 along section line I.

FIG. 3 shows a sectional view through the friction clutch shown in FIG. 1 along line I-I. As can be seen from the sectional view in FIG. 3, the spring element 12 lies between the cover housing 2 of the clutch and the axial stop 8 of the retaining tabs 6, while the holding ring 5 contacts the diaphragm spring 4. When play occurs between the holding ring 5 or axial stop 8 of the retaining tabs 6 and the diaphragm spring 4 due to wear, the axial raised portion 22 of the spring element 12 can relax and fill up the resulting space.

Figure 4:
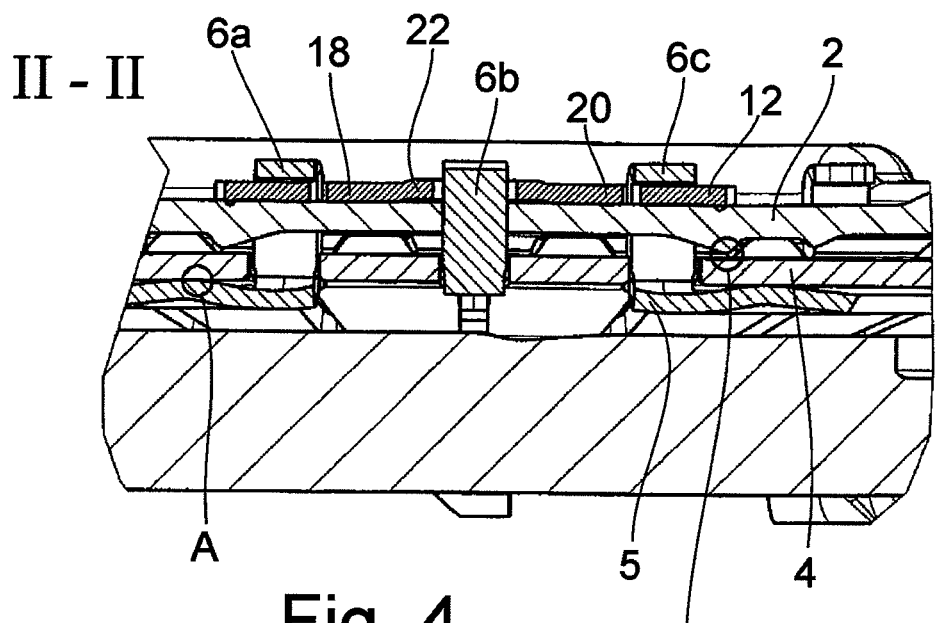
FIG. 4 is a sectional view through the friction clutch shown in FIG. 1 along section line II.

FIG. 4 likewise shows a sectional view through the friction clutch shown in FIG. 1 along line II-II.

As can be seen from FIG. 4, the axial raised portion 22 can be constructed such that it is supported at the axial stop 8 of the retaining tab 6, while the support regions 18, 20 contact the clutch housing 2. But, as was already mentioned, it is also possible to reverse the spring device 12 so that the axial raised portion 22 is supported at the clutch housing 2, while the support regions 18, 20 press against the axial stops 8 of the retaining tabs (6a, 6b, 6c).

The spring element 12 between the clutch housing 2 and the axial stop 8 of the retaining tabs 6, the spring element 12 can also be arranged between the holding ring 5 and diaphragm spring 4 or between the diaphragm spring 4 and housing 2. The two possible positions are designated, respectively, by A and B in FIG. 4. Depending on the installation position, it is advantageous to adapt the axial raised portion 2 and the support regions 18, 20 to structural conditions.

Figure 5:
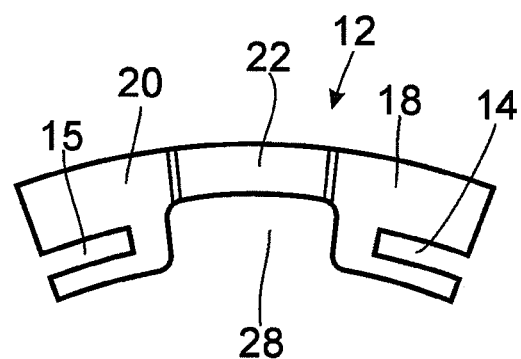
FIG. 5 is a top view of a second embodiment example of the spring element according to the invention.

When the spring element 12 is arranged between the holding ring 5 and the diaphragm spring 4, for example, it is advantageous when, as is shown in FIG. 5, the cutout in the axial raised portion 22 is formed as a notch 28 rather than as an opening 16. Further, as can be seen from FIG. 5, the spring element 12 also has guides 14 and 15 in this instance which enclose the retaining tabs 6 and provide a support at the diaphragm spring 4. The axial raised portion 22 is supported at the holding ring 5 so that the play between the diaphragm spring 4 and the surrounding structural component parts which occurs as a result of wear is compensated.

Instead of the arrangement shown in the drawings, the spring element 12 can also encompass two or more axial raised portions 22, each with an additional support region arranged therebetween, so that four or more retaining tabs can be enclosed instead of three. In so doing, a retaining tab 6 of the holding ring 5 is pushed and bent through the middle cutouts during assembly. The axial raised portions 22 of the spring element 12 are accordingly compressed so that a spring preloading takes place.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

We claim:

1. A clutch assembly for a friction clutch of a motor vehicle, comprising:
   a diaphragm spring;
   a pressure plate;
   a holding ring with a plurality of retaining tabs distributed over a circumference of the holding ring, wherein the retaining tabs extend in an axial direction, the plural retaining tabs arranged so as to define an axial stop;

at least one clutch housing in which the diaphragm spring that acts on the pressure plate is arranged and which is secured to the clutch housing by the plural retaining tabs of the holding ring;

a spring element configured as a circular segment is arranged between two adjacent structural component parts of the clutch assembly arranged between the holding ring and the axial stop of the plural retaining tabs, the spring element configured to exert an axial spring force on the adjacent structural component parts, the spring element is arranged on at least one retaining tab and has at least two edge-side support regions extending in circumferential direction of adjacent retaining tabs and at least partially contacting one structural component part and, further, has at least one axial raised portion arranged between the support regions that at least partially contacts the other structural component part.

2. The clutch assembly according to claim 1, wherein the at least one axial raised portion has at least one cutout for a respective retaining tab in a respective vertex area.

3. The clutch assembly according to claim 1, wherein at least one of the edge-side support regions has a guide that encloses a respective retaining tab adjacent to the axial raised portion.

4. The clutch assembly according to claim 3, wherein both of the edge-side support regions have a respective guide.

5. The clutch assembly according to claim 3, wherein the at least one edge-side guide is able to move along the respective retaining tab enclosed by the edge-side guide.

6. The clutch assembly according to claim 3, wherein at least one of the at least one edge-side guide is open at an edge side.

7. The clutch assembly according to claim 3, wherein at least one of the at least one edge-side guide is an opening configured as an elongated hole.

8. The clutch assembly according to claim 1, wherein the spring element has two or more axial raised portions, each of which has at least one cutout, wherein another support region is arranged between the axial raised portions in each instance.

9. The clutch assembly according to claim 8, wherein the cutout in the axial raised portion is an opening configured as an elongated hole such that a respective retaining tab is receivable therein.

10. The clutch assembly according to claim 8, wherein the cutout is a radial notch that extends along the entire axial raised portion.

11. The clutch device according claim 10, wherein the spring force of the spring element is determined by at least one of the quantity of spring elements that are provided, the height of the axial raised portion of every spring element, and the stiffness of the spring element material.

12. The clutch assembly according to claim 1, wherein at least two separate spring elements are provided arranged opposite one another.

13. The clutch device according claim 1, wherein the spring force of the spring element is determined by at least one of the quantity of spring elements that are provided, the height of the axial raised portion of every spring element, and the stiffness of the spring element material.

14. The clutch assembly according to claim 1, wherein the spring element is arranged between one of the holding ring and the diaphragm spring, between the axial stop of the retaining tab and the clutch housing, and between the diaphragm spring and the clutch housing.

* * * * *